Figure 1:
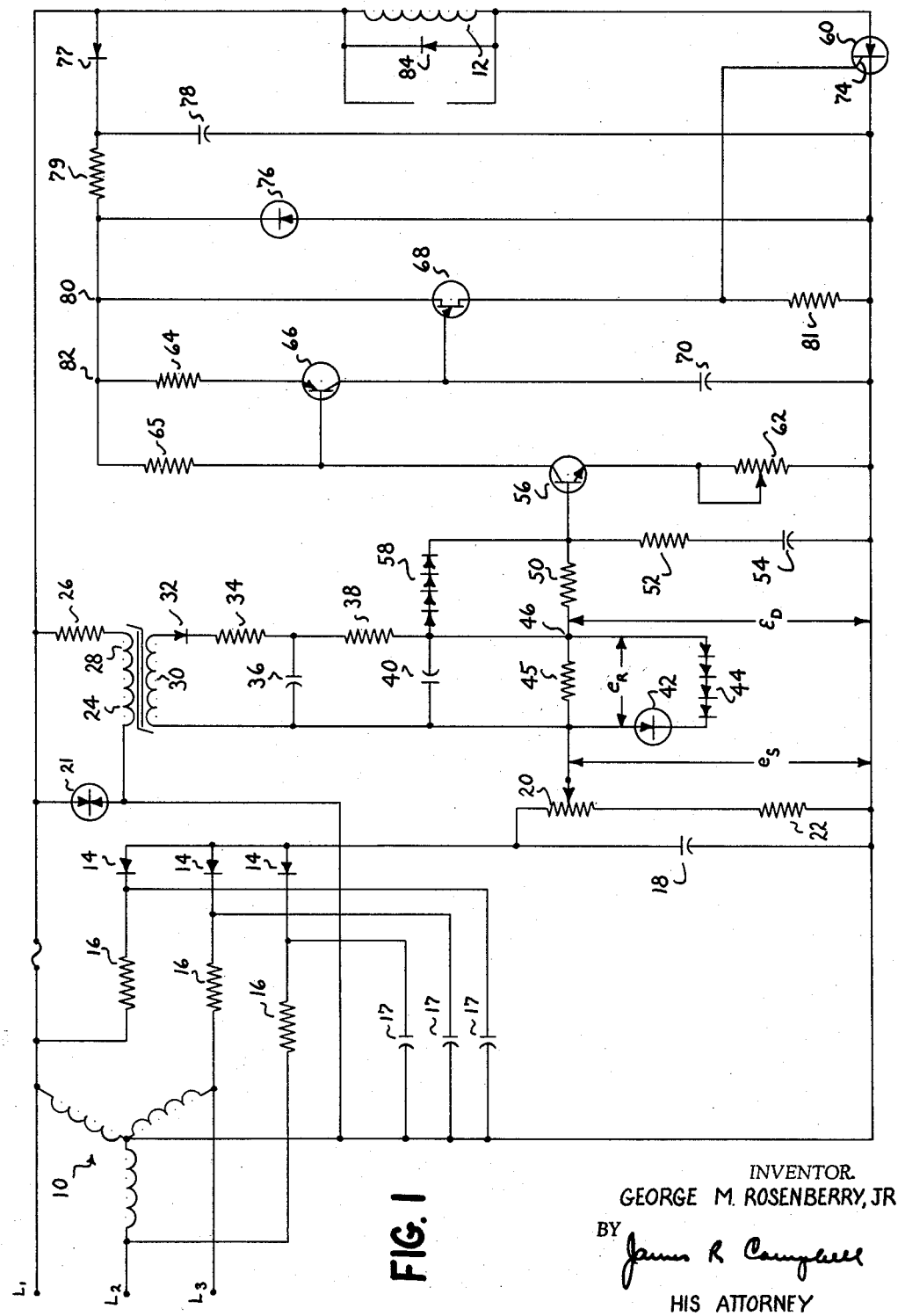

Feb. 18, 1964  G. M. ROSENBERRY  3,121,836
CONTROL SYSTEM FOR A GENERATOR
Filed Aug. 31, 1962  2 Sheets-Sheet 1

INVENTOR.
GEORGE M. ROSENBERRY, JR.
BY James R. Campbell
HIS ATTORNEY

Feb. 18, 1964  G. M. ROSENBERRY  3,121,836
CONTROL SYSTEM FOR A GENERATOR
Filed Aug. 31, 1962  2 Sheets-Sheet 2

INVENTOR.
GEORGE M. ROSENBERRY, JR.
BY James R Campbell
HIS ATTORNEY

United States Patent Office 3,121,836
Patented Feb. 18, 1964

---

3,121,836
CONTROL SYSTEM FOR A GENERATOR
George M. Rosenberry, Schenectady, N.Y., assignor to General Electric Company, a corporation of New York
Filed Aug. 31, 1962, Ser. No. 220,624
9 Claims. (Cl. 322—24)

The invention described herein relates to a generator control system and particularly to a low cost, high performance regulator designed for use in a system controlling the terminal voltage of a generator serving a variable load.

Generators useful in supplying power to a load inherently are not self-compensating to maintain a constant voltage output when changes in the load requirements take place. To overcome this deficiency, regulators of many different kinds are used for sensing the changes in load voltage and are equipped with the necessary circuitry to vary the generator field excitation to obtain the desired voltage characteristics at the generator output terminals.

Such regulators generally are either of the mechanically operating or static types. In both designs, the regulator is connected between the generator output terminals and the input to the generator field winding, or to a separate exciter used in exciting the generator field. In the mechanically operating type, a solenoid equipped with a spring load plunger senses variations in load voltage and actuates a finger type contact assembly to change the resistance in a circuit which supplies power to the exciter or generator field winding. Although this design is of relatively low cost, the multitude of mechanically operating parts are subject to wear and fatigue. Changes in characteristics of the electrical components also occur when the regulator is operated in an adverse environment, such as one including dirt and moisture, or where vibration and shock conditions exist.

The static type of regulator generally includes a magnetic amplifier capable of having its impedance changed upon the introduction of a control signal. This is accomplished by matching the generator output voltage against a reference, and the difference voltage is then applied to a saturable reactor for varying its impedance and therefore causing it to supply a voltage to the generator field winding corresponding to the change in load voltage appearing at the output terminals of the generator. The primary disadvantage of the static type of voltage regulator is its high cost and size. Because of its relatively large size, the designer does not have the freedom which often is needed to assemble the power components into an integrated unit. Its cost is roughly several times greater than that of the mechanically operating regulator which generally performs the same function but with less precision. Another disadvantage is the amplifier magnetic characteristics permit it to be sensitive to shock and vibration which changes its performance, and to moisture which changes its electrical characteristics. These disadvantages in addition to the relatively high cost and size makes it unattractive for use in many installations.

The primary object of my invention therefore is to provide a high performance, low cost voltage regulator capable of withstanding the adverse mechanical and atmospheric effects when operated in hostile environments.

Another object of my invention is the provision of a voltage regulator capable of sensing changes in load voltage and being effective to control the supply of excitation power to the source serving the load for maintaining a constant output voltage.

Still another object of my invention is to provide a voltage regulator useful with a generator and capable of sensing and matching changes in load voltage against a reference voltage for producing a control signal effective in activating a firing circuit which acts to control the supply of excitation power to a generator.

Another objective of my invention is to provide a regulator capable of regulating the generator output voltage to a predetermined function of output frequency but relatively independent of load.

In carrying out the above objects of my invention, I connect a voltage regulator between the generator output terminals and the input terminals to an exciter or to a generator field winding. When changes in the load served by the generator occur, circuits are provided which sense such changes and then match them against a reference voltage for obtaining a difference or error voltage. This error voltage is effective in energizing a firing circuit which turns on a semi-conductor device for furnishing excitation power to a generator field winding in an amount sufficient to maintain a constant voltage output at the generator terminals. It will be apparent to those skilled in the art that the regulator will have application to any one of a multitude of networks which includes a varying load being served by a voltage source.

Figure 2:
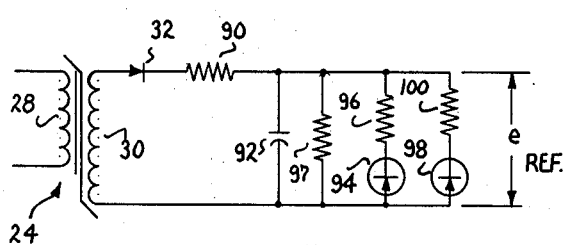
Figure 4:
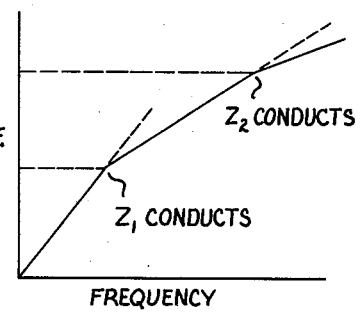
Figure 3:
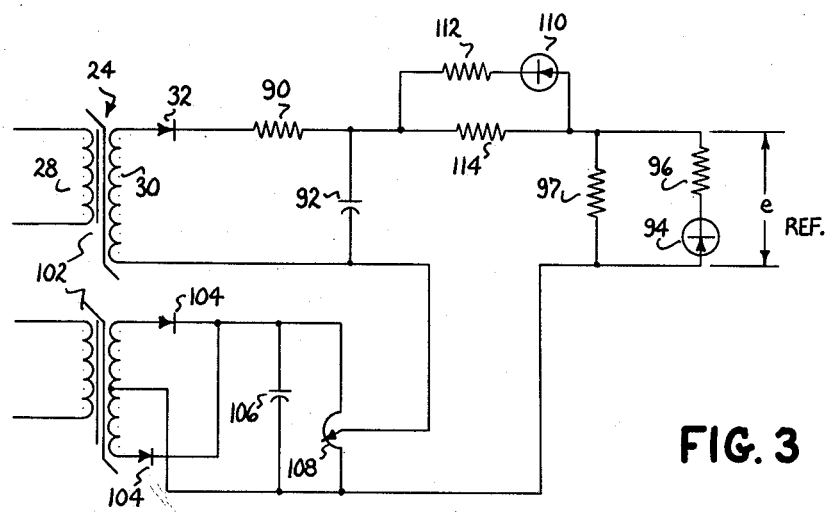
Figure 5:
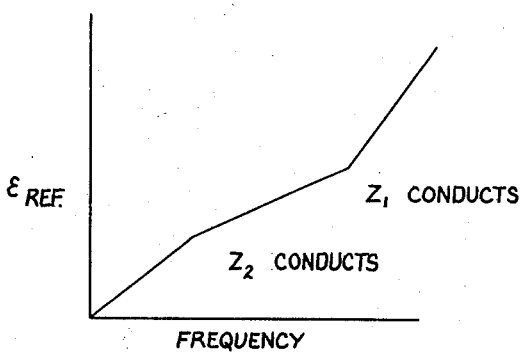

While the specification concludes with claims particularly pointing out and distinctly claiming the subject matter which I regard as my invention, it is believed the invention will be better understood from the following description taken in connection with the accompanying drawings in which:

FIGURE 1 diagrammatically illustrates the circuitry for a voltage regulator useful in controlling a power source serving a varying load;

FIGURES 2 and 3 are modifications to a reference circuit shown in the regulator of FIGURE 1; and FIGURES 4 and 5 illustrate reference voltage verses frequency curves respectively applicable to the reference circuits of FIGURES 2 and 3.

Referring now to the drawings wherein like reference characters designate like or corresponding parts throughout the several views, there is shown in FIGURE 1, a voltage regulator useful in sensing variation in generator load voltage and frequency and being effective to control the supply of sufficient excitation power to an exciter or generator field for maintaining the voltage constant at the generator terminals. As more fully described hereafter, the regulator comprises (a) a sensing circuit which senses the generator output voltage and converts it from alternating to direct current voltage of reduced magnitude, (b) a reference circuit which produces a reference voltage which is a predetermined function of frequency but relatively independent of generator voltage and wherein the sensed voltage is matched against the reference voltage to produce an error signal, (c) a stabilizing circuit for making the system stable and providing the desired dynamic characteristics by making possible adequate steady-state gain and voltage regulation, (d) a firing circuit for converting and amplifying the D.C. error signal to a firing angle pulse for causing conduction of a controlled rectifier such as a silicon controlled rectifier, and (e) a power circuit including the controlled rectifier for supplying excitation power to a field winding.

Referring more specifically to FIGURE 1, there is shown a three-phase generator or alternator winding 10 having output terminals $L_1$, $L_2$ and $L_3$. Although the drawings do not illustrate the mechanical parts of the generator, it will be understood it includes the above mentioned armature windings and field windings which when energized causes production of an output voltage at the armature terminals. The generator may be of any size and may be excited from any direct current source. In the preferred embodiment chosen to illustrate the invention, the D.C. source consists of a brushless exciter. In this design, the magnetic cores for the generator and the exciter are mounted on the same shaft, include windings, and are arranged for rotation in their corresponding stator cores likewise equipped with windings in the usual manner. A D.C. voltage is applied to the exciter field winding in the stator and rotation of the rotor produces an alternating voltage at its output terminals. This voltage is rectified by shaft mounted rectifiers and supplied to the generator field winding mounted on the same shaft. Rotation of the excited generator field winding produces a voltage in the generator armature which then is delivered to a load.

The regulator illustrated in FIGURE 1 is connected between the generator armature output terminals and the field winding 12 for the exciter. It is to be understood that although the invention is described in relation to a brushless synchronous generator, the exciter field winding 12 may comprise any device which is used for supplying excitation power to a generator. If desired, the field winding 12 may constitute the main field winding on the generator. Also, although the invention will be disclosed in relation to an exciter and an alternator, it further will be understood the regulator will have application to any kind of a power source, such as a direct current generator, providing an alternating or pulsating power source is available for the regulator, designed for providing constant voltage to a varying load.

Considering first the sensing circuit of the regulator, three-phase half-wave rectifiers 14 are connected respectively in series with voltage dividing resistors 16 and each phase of the generator armature winding. Conductor 17 extends to the neutral point in the winding. The function of the series resistors is to provide a low ripple output voltage having a value considerably less than that which would be obtained from conventional half wave rectifiers served by the same A.C. supply and also having ripple characteristics substantially the same as that obtainable from a three-phase rectifier bridge. The size of the resistors 16 preferably are chosen to give a ten to one or more reduction in the voltage thereby providing a replica of the output voltage to the sensing circuit. Other ratios may of course be used. The condensers 19 protect the rectifiers 14 against peak reverse voltages.

The sensing circuit further includes a capacitor 18, a variable resistor 20, such as a potentiometer, and a fixed resistor 22. The function of the capacitor 18 is to prevent spikes or high level peaks from the line voltage carrying into the regulator circuits with the possibility of damage to transistors and other components used therein. The capacitor further prevents the transformer interwinding capacitance from feeding interference into the circuit. It also provides some filtering for the sensed voltage.

The potentiometer 20 provides for reduction in the voltage supplied from the rectifiers while simultaneously serving as a means for accommodating variations in the values of electrical components in the various circuits and also providing a means of adjusting the alternator output voltage to the desired value.

It will be apparent that the output voltage from the sensing circuit is a replica of the voltage supplied to the load. Its value at any instant is a function of the sensing circuit parameters and the particular voltage being supplied to the load. The ripple output from the three-phase, half-wave sensing rectifier closely approximates the ripple voltage of a three-phase, full-wave bridge rectifier. This is accomplished by the three series resistors 16. A single resistor could be used in lieu of the series resistors, but the series resistors make possible a considerable reduction in the ripple voltage and the elimination of a large size filter capacitor in the sensing circuit which otherwise would be needed with a single resistor. The filter time constant is reduced and the regulator performance improved. In the case of single phase alternators, the capacitor 18 is increased in size to provide sufficient filtering for the sensed voltage. One of the input leads to the sensing rectifiers 14 would not be used for single phase operation.

To determine the degree of change in voltage at the generator terminals because of varying load conditions, the sensed rectified voltage is compared with a reference voltage which preferably is maintained at a constant, unvarying level. As more fully described hereafter, the reference voltage may be permitted to drop as the generator frequency drops below a critical value. Whether the reference voltage is maintained constant or permitted to vary depends on the particular application of the regulator to a generator. In those situations where an engine-generator combination is supplying a load, the conventional regulator will attempt to maintain the generator output voltage at a predetermined high level when the engine is in an idling condition. Since this cannot be accomplished because of reduction in generator speed, overheating of the generator or regulator occurs if the condition exists for a relaitvely short period of time. The reference voltage therefore is permitted to drop with decrease in generator frequency thus allowing the generator voltage to drop with frequency which it naturally does if excessive excitation power is not supplied.

The reference circuit includes the saturable transformer 24, including a current limiting resistor 26 connected in series with the primary 28, and a secondary 30. The transformer saturates each half-cycle and when in this condition, the average voltage on the secondary is proportional to frequency and is relatively independent of line voltage. For best results, this requires a sharp saturation curve. In the particular embodiment disclosed herein, a toroidal core was used to reduce the leakage reactance after each cycle. The voltage output from the secondary which is independent of line voltage is rectified by the rectifier 32 to provide a direct current proportional to frequency. Resistor 34 averages the current and capacitor 36 is used for filtering the rectified output of the transformer. This current then is supplied to an additional filtering circuit including capacitor 40. An inductive filter could be used if desired. A Zener diode 42 and rectifiers 44 are connected across resistor 45 to provide the desired reference voltage variation with frequency. Rectifiers 44 are used for temperature compensation. They may be omitted if slight changes in voltage with ambient temperature are acceptable. The function of the Zener diode is to make the reference voltage constant above a predetermined frequency. The Zener diode-resistor arrangement provides a constant voltage reference, independent of frequency over a normal operating range. However, if the frequency drops below a predetermined value of 60 cycles per second, for example 50 or 55 cycles per second, the reference voltage would start dropping to provide constant volts per cycle. By utilizing this circuit arrangement, the possibility of damage to the generator windings, regulator or other components in the system becomes remote when the generator is driven at reduced speed for a sustained period of time. Such conditions of reduced speed frequently occur when the engine is being raised to an operating temperature level or when it is placed in an idling condition because of the lack of demand placed on the generator by the load.

The direct voltage from the sensing circuit is proportional to line voltage and has a value equal to that appearing between the output of the potentiometer 20 and the lead 17, indicated on the drawing as $e_s$. The reference voltage is independent of line voltage and is equal to that appearing across the Zener diode 42 and rectifiers 44 and is indicated by $e_r$. The difference or error voltage will be that appearing across the output of the reference circuit and the lead 17 and is indicated as $e_d$. The error voltage thus produced is used for controlling a pulse in the firing circuit as more fully described hereafter.

The stabilizing circuit consists of fixed resistors 50 and 52 and a variable capacitor 54. The function of the stabilizing network is to stabilize the whole system and produce the desired transient characteristics and the desired gain to obtain steady-state regulation. In normal operation, the error signal from the reference circuit is supplied through the fixed resistor 50 to a transistor 56 in the firing circuit. However, in the event of large voltage dips, i.e., large error signals, the rectifiers 58 become operative to provide a low impedance path to the transistor 56. When large error signals are detected or are in existence, it means there is a substantial reduction in line voltage resulting from the placing of a heavy load on the generator. When this occurs, a larger excitation voltage must be supplied to the generator field winding and it therefore is necessary for the silicon controlled rectifier 60 to fire earlier in the cycle in order to obtain a reduction in the firing angle.

Considering now the firing circuit, the transistor 56 and resistor 62 act as an emitter follower amplifier and amplify the error signal supplied to the transistor. In this degenerative kind of feedback arrangement, the resistor 62 sets the value of amplification. The current out of the transistor is approximately equal to the error voltage divided by the resistance of resistor 62, thus indicating that the current is proportional to error voltage. Resistor 62 is used to adjust circuit gain. The parallel circuit including fixed resistors 64 and 65 and transistor 66 are used for an additional step of amplification. The combination of these two transistors provides both an additional gain and a control voltage in the firing circuit. The firing circuit controls capacitor 70 charging current and not voltage. The current flowing from transistor 66 towards transistor 68 is independent of the voltage of capacitor 70. The capacitance current is constant even though the voltage may be increasing. This provides a linear charging condition and gives smooth control characteristics over a wide range of firing angles. Since the current is proportional to the error voltage, capacitor 70 will charge linearily and the rate is proportional to the current. When this capacitor becomes charged to the peak voltage of the unijunction transistor 68, the latter fires and a pulse is supplied through lead 72 to the gate 74 to fire the silicon controlled rectifier 60. When the interbase voltage of transistor 68 goes to zero, the condenser discharges and then begins to recharge at the start of each new positive half cycle.

Zener diode 76 provides a fixed voltage of square wave shape. It clips the line voltage and makes the firing circuit voltage independent of line voltage. This permits adjusting of the firing angle over a wide range of values. When the line voltage goes negative, the interbase voltage of the transistor 68 goes to substantially zero before start of the positive half cycle. This ensures that capacitor 70 is discharged before the start of each positive half cycle. Stated differently, it obtains a fresh start for each cycle which is essential to the maintenance of synchronism with the line voltage. The use of capacitor 78 is desirable because the input impedance of the transistor 68 decreases when the voltage is removed from it. This causes reduced performance of the system as a result of the stabilizing circuit, that is, if all the voltage is permitted to be removed from the transistor during the negative half cycle, its input impedance drops and the stabilizing capacitor discharges thus resulting in poor performance of the overall system. Capacitor 78 sustains the voltage during most of the negative half cycle and the transistor voltage goes to near zero at the end of each negative half cycle.

The diode 77 and capacitor 78 keep direct current on the transistors 56 and 66 while maintaining positive synchronization of the transistor 68 with the line voltage. This filter arrangement provides smooth linear control which may decrease to zero output to the exciter field. The importance of this is it permits obtaining the required no load field voltage for small machines while still providing adequate forcing for large machines. The diode and capacitor therefore are subjected to full line to neutral voltage and in some cases this may be minimized by relocating them between points 80 and 82 with the diode pointing toward point 82 and the capacitor connected from terminal 82 to 17. This reduces the diode and capacitor voltage ratings to that of the Zener diode 76. The desired value of the capacitor is considerably large to keep the transistor 66 voltage constant. The magnitude is less critical.

The rectifier 84 carries field current when the controlled rectifier 60 is not conducting.

The resistor 86 is sometimes necessary for the initial build-up period when the field current starts from zero. It is provided to carry sufficient current to insure that the controlled rectifier 60 will stay on after it is first turned on for a very short time by the firing pulse of transistor 68 which may last only 10 to 20 microseconds. Without this resistor the controlled rectifier will turn off after the firing pulse disappears if the current in the highly inductive field circuit has not had time to build up to the holding current value.

Since the firing circuit is in synchronism with the line voltage but independent of it, it is apparent that the timing of discharge of capacitor 70 during the positive half of the cycle, for causing controlled rectifier 60 to fire and provide excitation power to the field winding 12, will be dependent on the magnitude of the error voltage. If the error voltage is small, the condenser will be caused to discharge at a later time in the cycle and thus cause delivery of a relatively small amount of additional excitation power to the field winding. If the error voltage is large, the condenser will discharge during an earlier part of the positive half cycle, thus decreasing the firing angle and causing a relatively large amount of additional excitation power to be furnished the field winding.

The modifications appearing in FIGURES 2 and 3 relate to the reference circuit of the regulator. In some installations, a constant voltage reference will not provide the desired degree of performance and a volts per cycle reference therefore may be used for accurately determining the difference between the sensed and reference voltages.

Referring to FIGURE 2, the saturable transformer 24 is the same as that previously described and includes a primary 28 and secondary 30 having a series connected rectifier 32 for furnishing direct voltage to the circuit. A filter circuit including a fixed resistor 90 and capacitor 92 whose primary purpose is to average the direct current from the transformer to provide a voltage directly proportional to frequency when the transformer is in a saturated condition. The Zener diode 94 ($Z_1$) and resistor 96 are connected in parallel with resistor 97 through which current flows when the diode 94 is in a blocking condition. The diode and resistor make it possible to shape the voltage versus frequency characteristic shown in FIGURE 4. An additional Zener diode 98 ($Z_2$) and resistor 100 may be added if desired to obtain additional shaping as shown by the dotted lines.

These modifications of the linear reference voltage versus frequency characteristics are desirable to correct the effects of changes in gain of the regulator and exciter as a function of frequency. They make it possible to obtain accurate volts per cycle performance even with a brushless exciter which has appreciable gain changes with frequency.

The modification of FIGURE 3 illustrates an alternative modification to the reference circuit. The circuit is essentially the same as that in FIGURE 2 and includes a variable frequency source such as the saturable transformer 24 having a primary 28 and a secondary 30 with filtering components including the rectifier 32, resistor 90 and capacitor 92. The function of resistor 99, Zener diode 94 and resistor 96 remains the same. In some installations, excitation voltage should be supplied to the exciter field when the frequency is zero. This is not possible in the circuit of FIGURE 2 but is accomplished in FIGURE 3 by adding a constant voltage and frequency source which includes a transformer 102 having rectifiers 104 and a filtering condenser 106 in its secondary for furnishing a D.C. voltage to potentiometer 108. When the frequency of voltage from the variable frequency source drops to zero, the transformer 102 will constitute the source of direct current power for the circuit to provide the desired reference voltage. It will be apparent that a separate 60 cycle power source or any other power supply capable of furnishing direct current for the circuit may be used.

This modification of adding a fixed voltage to provide an adjustable intercept of the reference voltage at zero frequency is shown in FIGURE 5. The Zener diode 110 ($Z_1$) and associated resistors 112 and 114 make possible an increase in slope of the reference voltage versus frequency characteristic. When $Z_2$ conducts, as indicated in FIGURE 5, it indicates a decrease in the load resistance and the slope changes to a sharper angle when $Z_1$ conducts since the effective reactance of parallel resistors 112 and 114 is lower.

This circuit is desirable for a volts per cycle static exciter where the power source for the regulator is taken from a 60 cycle power line. Only the reference power and the sensing power is taken from the variable frequency alternator. This would require that the regulator power output be fed to the generator field through slip rings to obtain wide speed range operation when a rotating exciter is not used.

It will be apparent to those skilled in the art that many modifications and variations are possible in light of the above teachings. It therefore is to be understood that within the scope of the appended claims, the invention may be practiced otherwise than as specifically described.

What I claim as new and desire to secure by Letters Patent of the United States is:

1. A system for controlling the output voltage of a generator having armature and field winding comprising a sensing circuit including a rectifier and means connected to the generator armature winding for providing a sensed replica direct voltage of reduced magnitude, a reference circuit including means connected to the generator armature winding for developing a reference voltage proportional to frequency but independent of line voltage, means for amplifying the voltage difference between the sensed and referenced voltages, means for amplifying the voltage difference and supplying it to a timing capacitor having a charging current proportionate to voltage, and means connecting the timing capacitor to a switching device, and means for synchronizing the timing capacitor with the power supply to the regulator to assure energization of the switching device at the correct time, and means connecting the generator field winding with the switching device for supplying the desired excitation power corresponding to the difference voltage to the generator field winding.

2. A system for controlling the voltage output of a generator having armature and field windings comprising a sensing circuit including rectifying and voltage reducing means connected to the generator armature winding for providing a replica direct voltage at the circuit output terminals, means providing a reference voltage proportional to frequency but independent of the generator voltage, and means for matching said replica and reference voltages, a firing circuit including means for amplifying the difference voltage of said replica voltage and reference voltage, a capacitor connected with the amplifying means and a charging and discharging patch for said capacitor, and means associated with the capacitor for maintaining the timing of charging and discharging of the capacitor in synchronism with the generator line voltage, a conducting device connected with the capacitor discharge path and arranged to be converted to a conducting state by the capacitor discharge current for supplying excitation power to the generator field winding.

3. A system for controlling the output voltage of a generator having armature and field windings comprising rectifying and voltage reducing components connected with the generator armature winding for developing a sensed replica direct voltage, a saturable magnetic device connected with a voltage source for producing a reference voltage proportional to frequency and independent of the generator line voltage, means in series with the magnetic device for holding the reference voltage constant above a predetermined frequency, means matching the sensed and reference voltages to produce a difference voltage, said voltage difference being proportional to the change in generator output voltage being supplied to a load, at least one amplifying device made operative by the difference voltage to permit charging of a capacitor, a charging path and a discharging path for said capacitor, said discharging path including a conducting device for permitting current from the capacitor during discharge to activate a semiconductor device, said semiconductor device being connected with the generator field winding to provide an amount of excitation power thereto corresponding to said difference voltage thereby providing a constant voltage output from the generator.

4. A system for controlling the output voltage of a generator having armature and field windings comprising a sensing circuit including rectifying and voltage reducing components connected to the generator armature winding for providing a replica direct voltage, a reference circuit including a saturable magnetic device and a rectifier providing a reference voltage, means matching the replica and reference voltages to arrive at a difference voltage, amplifying means connected with the reference circuit for amplifying the difference voltage, a capacitor connected with the amplifying means and having a charging current proportional to the difference voltage, a switch having a peak firing voltage substantially the same as said capacitor and connected with said capacitor for furnishing a pulse when the capacitor discharges to a semi-conductor device, means connecting the semi-conductor device with the generator field winding so that when the pulse fires said semi-conductor device, an amount of excitation power corresponding to said difference voltage is supplied to said field winding for furnishing constant voltage at the generator output terminals.

5. The system according to claim 4 including stabilizing means interconnecting the output of said reference circuit and said amplifying means for producing the desired level of gain in the system to obtain steady-state regulation.

6. A system for controlling the output voltage of a generator having armature and field windings comprising a sensing circuit including rectifying and voltage reducing means connected to the generator armature winding for providing a sensed direct voltage which is a replica of the generator output voltage, a device in the sensing circuit for adjusting the generator output voltage and for further reducing the sensed voltage, a reference circuit including a magnetic saturable device having a power source and a rectifier for furnishing a reference voltage, a component connected with the saturable device for maintaining the reference voltage frequency constant above a predetermined value, means matching the sensed and reference voltages to provide a difference voltage, an amplifying device, stabilizing means for providing the desired level of gain and for obtaining steady-state regulation in the system interconnecting the reference voltage output with said amplifying device, a capacitor connected to the amplifying device and having a charging current proportional to the difference voltage, a transistor connected between the capacitor and a semi-conductor device, said transistor having a peak firing voltage substantially the same as the peak voltage of the capacitor so that when the transistor fires a pulse is delivered to the semi-conductor device for causing it to conduct, semi-conductor device being connected with the generator field winding for providing excitation power to the latter corresponding to said difference voltage.

7. The system according to claim 6 including a Zener diode connected across the transistor for making the amplifying device control voltage independent of generator line voltage.

8. The system according to claim 6 including means for synchronizing the charging of said capacitor with the generator line voltage.

9. The combination according to claim 6 including a parallel circuit of a rectifier and a resistor connected across the generator field winding for carrying field current when said semi-conductor device is in a non-conducting state.

No references cited.